United States Patent
Wilde et al.

(10) Patent No.: US 10,661,530 B2
(45) Date of Patent: May 26, 2020

(54) METHODS AND APPARATUS TO COUPLE A DECORATIVE LAYER TO A PANEL VIA A HIGH-BOND ADHESIVE LAYER

(71) Applicant: The Boeing Company, Chicago, IL (US)

(72) Inventors: John Wilde, Mill Creek, WA (US); Jason Drexler, Brier, WA (US); Xiaoxi Wang, Mukilteo, WA (US); Gary Benham, Marysville, WA (US)

(73) Assignee: The Boeing Company, Chicago, IL (US)

( * ) Notice: Subject to any disclaimer, the term of this patent is extended or adjusted under 35 U.S.C. 154(b) by 583 days.

(21) Appl. No.: 15/153,266

(22) Filed: May 12, 2016

(65) Prior Publication Data
US 2017/0326836 A1  Nov. 16, 2017

(51) Int. Cl.
| | | |
|---|---|---|
| *B32B 7/12* | (2006.01) | |
| *B29C 70/08* | (2006.01) | |
| *B32B 37/00* | (2006.01) | |
| *E04C 2/36* | (2006.01) | |
| *B32B 7/14* | (2006.01) | |
| *B44C 1/10* | (2006.01) | |
| *B32B 37/12* | (2006.01) | |
| *B32B 37/14* | (2006.01) | |
| *B29C 63/02* | (2006.01) | |
| *B32B 3/12* | (2006.01) | |
| *B32B 38/10* | (2006.01) | |
| *B32B 5/18* | (2006.01) | |

(52) U.S. Cl.
CPC ............. *B32B 7/12* (2013.01); *B29C 70/086* (2013.01); *B29C 70/088* (2013.01); *B32B 7/14* (2013.01); *B32B 37/003* (2013.01); *B32B 37/12* (2013.01); *B32B 37/142* (2013.01); *B44C 1/105* (2013.01); *E04C 2/365* (2013.01); *B29C 63/02* (2013.01); *B29K 2715/006* (2013.01); *B29K 2995/0067* (2013.01); *B32B 3/12* (2013.01); *B32B 5/18* (2013.01); *B32B 38/10* (2013.01); *B32B 2305/022* (2013.01); *B32B 2305/024* (2013.01); *B32B 2305/076* (2013.01); *B32B 2307/3065* (2013.01); *B32B 2307/7246* (2013.01); *B32B 2327/12* (2013.01); *B32B 2367/00* (2013.01); *B32B 2605/18* (2013.01)

(58) Field of Classification Search
None
See application file for complete search history.

(56) References Cited

U.S. PATENT DOCUMENTS

| | | |
|---|---|---|
| 2,268,477 A | 12/1941 | Elmendorf |
| 2,664,833 A | 1/1954 | Armstrong et al. |
| 3,418,189 A | 12/1968 | Grosheim |
| 3,434,411 A | 3/1969 | Allen et al. |
| 4,219,376 A | 8/1980 | Roman |
| 4,238,437 A | 12/1980 | Rolston |
| 4,350,545 A | 9/1982 | Garabedian |
| 4,367,110 A | 1/1983 | Yoshikawa |
| 4,489,119 A | 12/1984 | Ishige et al. |
| 4,504,205 A | 3/1985 | Stofko |
| 4,598,007 A | 7/1986 | Kourtides et al. |
| 4,599,127 A | 7/1986 | Cannady, Jr. et al. |
| 4,693,926 A | 9/1987 | Kowalski et al. |
| 4,803,108 A | 2/1989 | Leuchten et al. |
| 4,855,182 A | 8/1989 | Ondrejas et al. |
| 5,037,350 A | 8/1991 | Richardson et al. |
| 5,085,921 A | 2/1992 | Jayarajan |
| 5,137,775 A | 8/1992 | Davis et al. |
| 5,589,016 A | 12/1996 | Hoopingarner et al. |
| 5,624,728 A | 4/1997 | Hoopingarner et al. |
| 5,698,153 A | 12/1997 | Hoopingarner et al. |
| 5,806,796 A | 9/1998 | Healey |
| 5,976,671 A | 11/1999 | Gleim |
| 6,066,385 A | 5/2000 | Kim |
| 6,251,497 B1 | 6/2001 | Hoopingarner et al. |
| 6,340,413 B1 | 1/2002 | Nilsson et al. |
| 6,419,776 B1 | 7/2002 | Hoopingarner et al. |
| 6,656,567 B1 | 12/2003 | Abe et al. |

(Continued)

FOREIGN PATENT DOCUMENTS

| | | |
|---|---|---|
| CH | 498714 | 11/1970 |
| CN | 202115040 | 1/2012 |

(Continued)

OTHER PUBLICATIONS

United States Patent and Trademark Office, "Office Action," issued in connection with U.S. Appl. No. 15/153,283, dated Jul. 12, 2018, 8 pages.

(Continued)

*Primary Examiner* — Anish P Desai
(74) *Attorney, Agent, or Firm* — Hanley, Flight & Zimmerman, LLC

(57) ABSTRACT

Methods and apparatus to couple a decorative layer to a panel via a high-bond adhesive layer are disclosed. An example apparatus includes a panel, a high-bond adhesive layer fixed to the panel, a liner fixed to the high-bond adhesive layer that is fixed to the panel, and a first decorative layer removably coupled to the liner that is fixed to the high-bond adhesive layer via a second adhesive layer. The high-bond adhesive layer is to impede at least one of gas or vapor from escaping the panel to deter the at least one of gas or vapor from exerting a pressure on the first decorative layer to deter a portion of the first decorative layer from separating from the panel.

20 Claims, 4 Drawing Sheets

(56) References Cited

U.S. PATENT DOCUMENTS

| | | | |
|---|---|---|---|
| 6,726,971 B1* | 4/2004 | Wong | C09J 7/22 |
| | | | 428/40.1 |
| 7,063,119 B1 | 6/2006 | Kim | |
| 7,289,906 B2 | 10/2007 | van der Merwe et al. | |
| 8,097,108 B2 | 1/2012 | Wilde et al. | |
| 8,715,824 B2* | 5/2014 | Rawlings | B32B 15/095 |
| | | | 428/337 |
| 9,031,782 B1 | 5/2015 | Lemay et al. | |
| 9,855,721 B2 | 1/2018 | Drexler et al. | |
| 10,173,394 B2 | 1/2019 | Wang et al. | |
| 2002/0084975 A1 | 7/2002 | Lin | |
| 2002/0160680 A1 | 10/2002 | Laurence et al. | |
| 2002/0182957 A1 | 12/2002 | Levenda | |
| 2003/0033779 A1 | 2/2003 | Downey | |
| 2003/0077423 A1 | 4/2003 | Flanigan et al. | |
| 2003/0190458 A1 | 10/2003 | Spiewak et al. | |
| 2003/0219578 A1 | 11/2003 | Jones et al. | |
| 2004/0146696 A1 | 7/2004 | Jones | |
| 2004/0192137 A1 | 9/2004 | Starkey et al. | |
| 2004/0253414 A1 | 12/2004 | Longobardi | |
| 2005/0050782 A1 | 3/2005 | Ryan et al. | |
| 2005/0052516 A1 | 3/2005 | Wilde et al. | |
| 2005/0088014 A1 | 4/2005 | Woodson et al. | |
| 2005/0153023 A1 | 7/2005 | Overton | |
| 2005/0255311 A1 | 11/2005 | Formella | |
| 2006/0089073 A1 | 4/2006 | Sobieski | |
| 2006/0151857 A1 | 7/2006 | Gasparoni | |
| 2006/0234010 A1 | 10/2006 | Wirrick et al. | |
| 2006/0246796 A1 | 11/2006 | Duffy | |
| 2006/0277807 A1 | 12/2006 | Wilde et al. | |
| 2007/0148410 A1 | 6/2007 | Wimer et al. | |
| 2007/0218269 A1 | 9/2007 | Kato et al. | |
| 2008/0087376 A1* | 4/2008 | Kitchin | C09J 7/22 |
| | | | 156/247 |
| 2008/0145600 A1 | 6/2008 | Hendren et al. | |
| 2008/0193695 A1 | 8/2008 | Kato et al. | |
| 2008/0237909 A1 | 10/2008 | Bech | |
| 2009/0057947 A1 | 3/2009 | Nemchick et al. | |
| 2010/0139839 A1 | 6/2010 | Ridgard et al. | |
| 2010/0215907 A1 | 8/2010 | Spires | |
| 2011/0014419 A1 | 1/2011 | Simmons et al. | |
| 2011/0042000 A1 | 2/2011 | Wilde et al. | |
| 2011/0250434 A1* | 10/2011 | Schauer | A47G 27/0437 |
| | | | 428/319.7 |
| 2012/0045638 A1 | 2/2012 | Waldman et al. | |
| 2014/0120303 A1* | 5/2014 | Wilde | B29C 63/481 |
| | | | 428/116 |
| 2014/0209231 A1* | 7/2014 | Schappert | B41M 5/0047 |
| | | | 156/71 |
| 2015/0203213 A1 | 7/2015 | Levien et al. | |
| 2016/0047675 A1 | 2/2016 | Tanenhaus et al. | |
| 2016/0089851 A1 | 3/2016 | Drexler et al. | |
| 2016/0250828 A1 | 9/2016 | Wilde et al. | |
| 2017/0326836 A1 | 11/2017 | Wilde et al. | |
| 2017/0326837 A1 | 11/2017 | Wang et al. | |
| 2017/0326845 A1* | 11/2017 | Benham | B32B 7/12 |
| 2017/0326858 A1 | 11/2017 | Wang | |
| 2017/0326859 A1 | 11/2017 | Wang et al. | |
| 2017/0326863 A1* | 11/2017 | Wang | B32B 7/12 |
| 2020/0086621 A1 | 3/2020 | Wang et al. | |

FOREIGN PATENT DOCUMENTS

| | | |
|---|---|---|
| DE | 19640263 | 4/1998 |
| DE | 102006054586 | 1/2008 |
| EP | 1013414 | 6/2000 |
| EP | 1600288 | 11/2005 |
| EP | 2085212 | 8/2009 |
| EP | 3000593 | 3/2016 |
| EP | 3061601 | 8/2016 |
| GB | 2174033 | 10/1986 |
| GB | 2228214 | 8/1990 |
| GB | 2491190 | 11/2012 |
| JP | 02088331 | 3/1990 |
| JP | 10030287 | 2/1998 |
| JP | 2000265589 | 9/2000 |
| JP | 2002138375 | 5/2002 |
| JP | 2004060061 | 2/2004 |
| JP | 2005075953 | 3/2005 |
| JP | 2005219504 | 8/2005 |
| JP | 2008037060 | 2/2008 |
| JP | 2011021094 | 2/2011 |
| JP | 2011206998 | 10/2011 |
| KR | 20110026567 | 3/2011 |

OTHER PUBLICATIONS

European Patent Office, "Extended Search Report," issued in connection with European Patent Application No. 17163791.1, dated Oct. 12, 2017, 11 pages.

European Patent Office, "Extended Search Report," issued in connection with European Patent Application No. 17163792.9, dated Oct. 17, 2017, 10 pages.

European Patent Office, "Extended Search Report," issued in connection with European Patent Application No. 17163793.7, dated Oct. 16, 2017, 7 pages.

United States Patent and Trademark Office, "Non-Final Office Action," issued in connection with U.S. Appl. No. 15/153,252 dated May 31, 2018, 19 pages.

European Patent Office, "Extended European Search Report," issued in connection with European Patent Application No. 18202385.3, dated Jan. 24, 2019, 10 pages.

United States Patent and Trademark Office, "Final Office Action," issued in connection with U.S. Appl. No. 15/153,338, dated Jan. 31, 2019, 26 pages.

United States Patent and Trademark Office, "Non-Final Office Action," issued in connection with U.S. Appl. No. 15/153,338, dated Aug. 27, 2018, 38 pages.

United States Patent and Trademark Office, "Requirement for Restriction," issued in connection with U.S. Appl. No. 15/153,338, dated Apr. 30, 2018, 7 pages.

United States Patent and Trademark Office, "Requirement for Restriction," issued in connection with U.S. Appl. No. 15/153,324, dated Mar. 28, 2018, 5 pages.

United States Patent and Trademark Office, "Non-Final Office Action," issued in connection with U.S. Appl. No. 15/153,324, dated Jun. 14, 2018, 42 pages.

United States Patent and Trademark Office, "Final Office Action," issued in connection with U.S. Appl. No. 15/153,324, dated Nov. 20, 2018, 31 pages.

United States Patent and Trademark Office, "Non-Final Office Action," issued in connection with U.S. Appl. No. 15/153,297, dated Mar. 13, 2018, 16 pages.

United States Patent and Trademark Office, "Advisory Action," issued in connection with U.S. Appl. No. 15/153,324, dated Feb. 7, 2019, 5 pages.

United States Patent and Trademark Office, "Notice of Allowance and Fee(s) Due," issued in connection with U.S. Appl. No. 15/153,297, dated Jul. 24, 2018, 27 pages.

3M, "200MP Micro-channel Laminating Adhesives. 467MC, 468MC, 467MCF and 468MCF", accessed at [http://kleylenta.ru/download/lenta/467mc.pdf] on Jun. 1, 2016, 3 pages.

WEINIG, "WEINIG Unimat 500: The All-Round Machine for Greater Flexibility in Profiling," retrieved from <https://web.archive.org/web/20160207205725/https://www.weinig.com/en/solid-wood/planing-machines-and-moulders/unimat-series/unimat-500.html> on Sep. 29, 2017, 3 pages.

Zhang et al., "Roll Manufacturing of Polymer Microfluidic Devices Using a Roll Embossing Process," Sensors and Actuators A, 230 (2015), pp. 156-169, 14 pages.

European Patent Office, "Extended European Search Report," issued in connection with European Patent Application No. 17163795.2, dated Oct. 18, 2017, 13 pages.

European Patent Office, "Extended European Search Report," issued in connection with European Patent Application No. 17163795.2, dated Mar. 2, 2018, 14 pages.

(56) References Cited

OTHER PUBLICATIONS

European Patent Office, "Extended European Search Report," issued in connection with European Patent Application No. 17163790.3, dated Oct. 17, 2017, 7 pages.
United States Patent and Trademark Office, "Non-Final Office Action," issued in connection with U.S. Appl. No. 15/153,283, dated Nov. 9, 2018, 44 pages.
Definition "coil/coiling," Merriam-Webster dictionary, retrieved on Nov. 13, 2018, 5 pages.
United States Patent and Trademark Office, "Final Office Action," issued in connection with U.S. Appl. No. 15/153,252, dated Feb. 27, 2019, 30 pages.
United States Patent and Trademark Office, "Non-Final Office Action," issued in connection with U.S. Appl. No. 15/153,324, dated Mar. 7, 2019, 21 pages.
United States Patent and Trademark Office, "Final Office Action," issued in connection with U.S. Appl. No. 15/153,283, dated Apr. 29, 2019, 42 pages.
European Patent Office, Communication pursuant to Article 94(3) EPC, issued in connection with European Patent Application No. 17 163 791.1, dated Oct. 16, 2019, 4 pages.
United States Patent and Trademark Office, "Final Office Action," issued in connection with U.S. Appl. No. 15/153,324, dated Aug. 20, 2019, 13 pages.
United States Patent and Trademark Office, "Notice of Allowance," issued in connection with U.S. Appl. No. 15/592,001 dated Sep. 27, 2019, 7 pages.
European Patent Office, Communication pursuant to Article 94(3) EPC, issued in connection with European Patent Application No. 18 202 385.3, dated Oct. 11, 2019, 4 pages.
United States Patent and Trademark Office, "Notice of Allowance," issued in connection with U.S. Appl. No. 15/153,283, dated Aug. 19, 2019, 31 pages.
European Patent Office, "Extended European Search Report," issued in connection with European Patent Application No. 1919688039, dated Dec. 3, 2019, 7 pages.
European Patent Office, "Communication pursuant to Article 94(3)," issued in connection with European Patent Application No. 17163792.9, dated Nov. 14, 2019, 7 pages.
United States Patent and Trademark Office, "Notice of Allowance and Fee(s) Due," issued in connection with U.S. Appl. No. 15/153,324, dated Dec. 31, 2019, 13 pages.
United States Patent and Trademark Office, "Final Office Action," issued in connection with U.S. Appl. No. 15/153,252, dated Jan. 29, 2020, 46 pages.
European Patent Office, "Communication pursuant to Article 94(3) EPC," issued on connection with European Patent Application No. 18 202 385.3, dated Mar. 25, 2020, 6 pages.

* cited by examiner

METHODS AND APPARATUS TO COUPLE A DECORATIVE LAYER TO A PANEL VIA A HIGH-BOND ADHESIVE LAYER

CROSS-REFERENCE TO RELATED APPLICATIONS

This patent relates to subject matter disclosed in U.S. patent application Ser. No. 15/153,252 entitled "Methods and Apparatus to Couple a Decorative Layer to a Core Layer of a Panel via a Barrier Layer", U.S. patent application Ser. No. 15/153,283 entitled "Methods and Apparatus to Couple a Decorative Composite Having a Reinforcing Layer to a Panel", U.S. patent application Ser. No. 15/153,297 entitled "Methods and Apparatus to Vent Gas and Vapor from a Panel via Venting Channels for a Decorative Layer", U.S. patent application Ser. No. 15/153,324 entitled "Methods and Apparatus to Form Venting Channels on a Panel for a Decorative Layer", U.S. patent application Ser. No. 15/153,338 entitled "Methods and Apparatus to Remove Gas and Vapor from a Panel for a Decorative Layer", all of which were filed on May 12, 2016 and are incorporated herein by reference in their entireties.

FIELD OF THE DISCLOSURE

This patent relates generally to decorative layers and, more particularly, to methods and apparatus to couple a decorative layer to a panel via a high-bond adhesive layer.

BACKGROUND

Vehicles (e.g., aircraft, buses, trains, tractor-trailers, ships, etc.), buildings and/or other structures (e.g., billboards) include surfaces that are visible to the public. Oftentimes, these surfaces include decorative images for aesthetic, identification and/or advertising purposes. For example, some surfaces of aircraft include decorative images that identify an airline carrier associated with the aircraft. In some instances, the decorative images are formed on a decorative laminate that is coupled to the surface of the vehicle, building and/or other structure. A pocket of gas and/or vapor (e.g., water vapor) may form between the decorative laminate and the surface, thereby causing an adjacent portion of the decorative laminate to bubble.

SUMMARY

In one example, an apparatus includes a panel, a high-bond adhesive layer fixed to the panel, a liner fixed to the high-bond adhesive layer that is fixed to the panel, and a first decorative layer removably coupled to the liner that is fixed to the high-bond adhesive layer via a second adhesive layer. The high-bond adhesive layer is to impede at least one of gas or vapor from escaping the panel to deter the at least one of gas or vapor from exerting a pressure on the first decorative layer to deter a portion of the first decorative layer from separating from the panel.

In another example, an apparatus includes a panel, first means for coupling fixed to the panel, means for lining fixed to the first means for coupling that is fixed to the panel, and first means for decorating a panel removably coupled to the means for lining that is fixed to the first means for coupling via a second means for coupling. The first means for coupling is to impede at least one of gas or vapor from escaping the panel to deter the at least one of gas or vapor from exerting a pressure on the first means for decorating to deter a portion of the first means for decorating from separating from the panel.

In another example, a method includes fixing a high-bond adhesive layer to a panel, fixing a liner to the high-bond adhesive layer that is fixed to the panel, and coupling a first decorative layer to the liner that is fixed to the high-bond adhesive layer via a second adhesive layer. The high-bond adhesive layer is to impede at least one of gas or vapor from escaping the panel to deter the at least one of gas or vapor from exerting a pressure on the first decorative layer to deter a portion of the first decorative layer from separating from the panel.

BRIEF DESCRIPTION OF THE DRAWINGS

The figures are not to scale. Instead, to clarify multiple layers and regions, the thicknesses of the layers may be enlarged in the drawings. Wherever possible, the same reference numbers will be used throughout the drawing(s) and accompanying written description to refer to the same or like parts.

DETAILED DESCRIPTION

Figure 1:
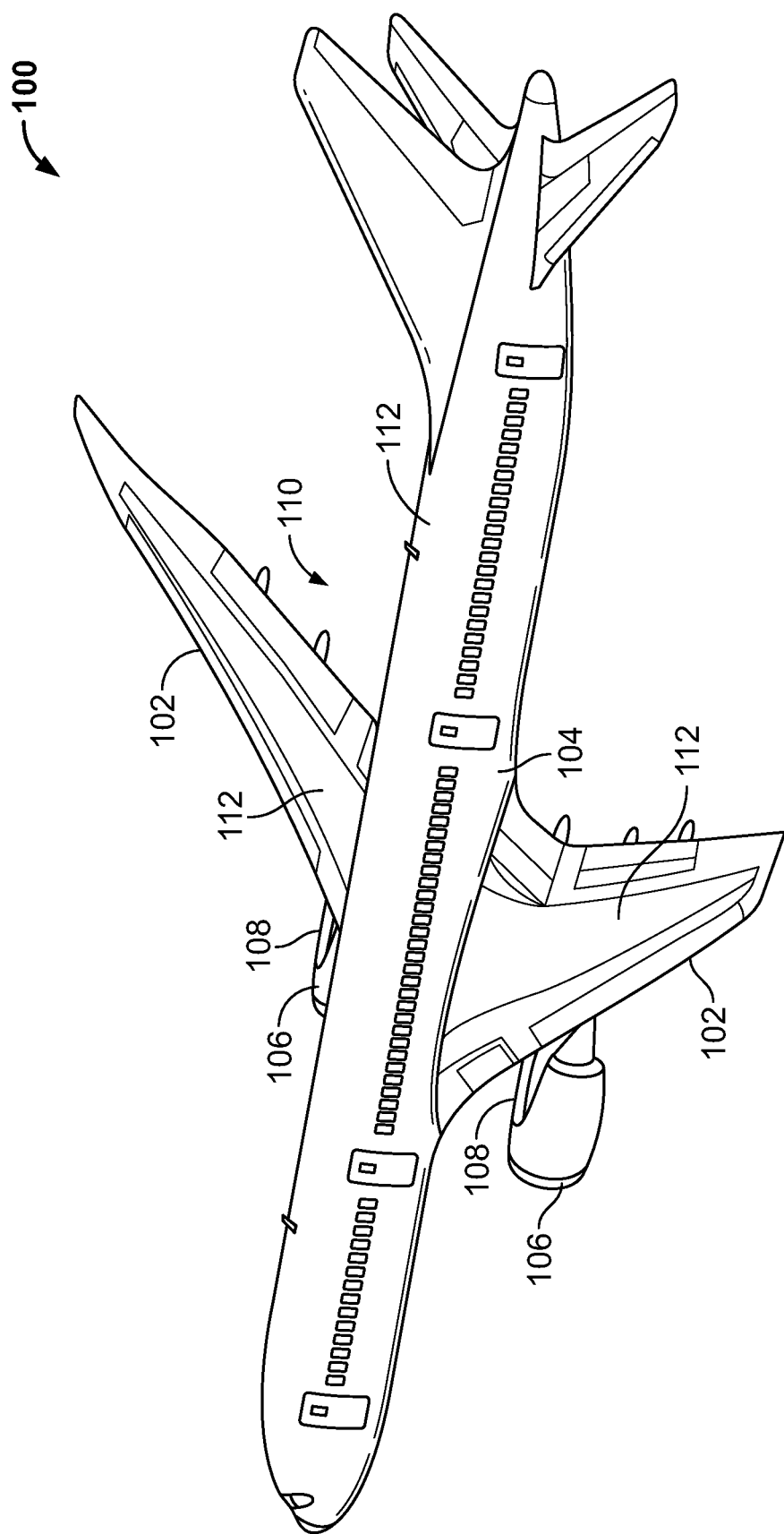
FIG. 1 depicts an example aircraft in accordance with the teachings herein.

Surfaces in public spaces (e.g., billboards, building walls, vehicle panels, etc.) oftentimes include decorative images for aesthetic, informational, and/or advertising purposes. For example, known aircraft and/or other vehicles (e.g., buses, trains, tractor-trailers, ships, etc.) often include decorative images on their surfaces for identification and/or advertising purposes. In some examples, the visible surfaces of aircraft interiors include decorative images that identify respective airline carriers associated with the aircraft.

Some known decorative images are formed on a decorative layer (e.g., a decorative laminate) that is coupled to a corresponding surface. For example, decorative layers are coupled to panels of aircraft via an adhesive layer. In some instances, a portion of the decorative layer or laminate may separate from the surface to which it is coupled. For example, a pocket of gas and/or vapor (e.g., water vapor) may form between the decorative laminate and the surface, thereby causing an adjacent portion of the decorative laminate to bubble. Such separation between the decorative laminate and the surface may be undesirable for aesthetic purposes (e.g., bubbling of the decorative laminate may be aesthetically unappealing) and/or may cause the decorative laminate to become damaged and/or to further separate (e.g., delaminate) from the surface over time.

In some instances, pockets of gas and/or vapor are entrapped between a decorative laminate and a surface of a panel (e.g., an interior surface in a compartment of the aircraft such as a surface of a bin, a lining, furnishings, etc.) when the decorative laminate is initially coupled to the surface. That is, the separation results from the decorative laminate not being laid flush with the surface when the decorative laminate is initially coupled to the surface.

In other instances, the pockets of gas and/or vapor that cause separation between the decorative laminate and the surface form as a result of the gas and/or vapor escaping from material of the panel and becoming trapped (e.g., to form a bubble) between the decorative laminate and the panel. When a decorative laminate is coupled to a panel of an aircraft, gas and/vapor (e.g., water vapor) may be emitted from a core layer (e.g., a honeycomb core, a foam core, etc.) of the panel and subsequently become trapped between the decorative laminate and the surface of the panel. For example, the gas and/or vapor may escape and/or may be emitted from the core layer of the panel when there is a difference in pressure and/or temperature between the core layer of the panel and the environment exterior to the panel. For example, the gas and/or vapor may migrate from the core layer toward the decorative laminate when pressure closer to the core layer is greater than pressure closer to the decorative laminate. The gas and/or vapor becomes trapped between the decorative laminate as a result of the decorative laminate being composed of substantially impermeable and/or nonporous material that deters and/or impedes the gas and/or vapor of the core layer from traversing therethrough. The trapped gas and/or vapor creates an internal pressure between the decorative laminate and the panel that applies a concentrated force to the decorative laminate and/or the surface, thereby causing the decorative laminate to separate from the surface of the panel (e.g., from the interior surface in the aircraft compartment, etc.). Additionally or alternatively, the gas and/or gas and/or vapor that is trapped between the decorative laminate and the panel may originate from an interaction (e.g., a chemical reaction, a physical reaction, etc.) between components of the panel and/or the decorative laminate such as between the core layer and a reinforcing layer of the panel, between the reinforcing layer and an adhesive coupled to the decorative laminate, etc.

To deter and/or impede gas and/or vapor from causing a portion of a decorative layer coupled to a panel from separating from the panel, the example methods and apparatus disclosed herein include a high-bond adhesive layer disposed between a panel and the decorative layer that deters and/or impedes gas and/or vapor from escaping from the panel to the decorative layer. Further, the example methods and apparatus disclosed herein include a second adhesive layer that enables the decorative layer to be repositioned and/or replaced to reduce maintenance time and/or costs for repair of the panel and/or the decorative layer.

In the examples disclosed herein, the high-bond adhesive layer has a high bond strength to enable the high-bond adhesive to be fixed to the panel and a liner to be fixed to the high-bond adhesive layer that is fixed to the panel. Further, a decorative layer (e.g., a first decorative layer) is removably coupled to the liner that is coupled to the high-bond adhesive layer via a second adhesive layer. The high-bond layer is composed of, for example, a crosslinked and/or semi-rigid adhesive material (e.g., an epoxy-based co-curing composite such as Cytec's Surface Master® 905) that is substantially nonporous and/or impermeable to deter and/or impede gas and/or vapor from traversing through the high-bond adhesive layer. For example, the epoxy-based co-curing high-bond adhesive further provides high tack, low creep, low flammability and/or other characteristics that improve performance of the decorative layer and/or the panel. Because the high-bond adhesive layer is disposed between the panel and the decorative layer, the high-bond adhesive layer deters and/or impedes gas and/or vapor emitted from the panel from reaching the decorative layer and creating an internal pressure between the decorative layer and a surface of the panel. Thus, the high-bond adhesive layer deters and/or impedes the gas and/or vapor from exerting a pressure and/or a force on a portion of the decorative layer to deter and/or impede that portion of the decorative layer from separating from the panel (e.g., to deter and/or impede the decorative layer from bubbling).

The liner of the examples disclosed herein deters and/or impedes the second adhesive layer from engaging and/or coupling to the high-bond adhesive layer. The liner is composed of a material such as polyethylene terephthalate (e.g., Mylar®), polyvinyl fluoride (e.g., Tedlar®), or polyvinylidene fluoride that enables the liner to remain securely fixed to the high-bond adhesive layer and enables the second adhesive layer to be removably coupled to the liner. For example, the material of the liner deters residue of the second adhesive layer from remaining fixed to the liner when the second adhesive layer is decoupled from the liner. Further, the second adhesive layer may be composed of a pressure-sensitive adhesive (e.g., an acrylic pressure-sensitive adhesive) that enables the decorative layer to be quickly and securely coupled to the liner.

In some examples, the second adhesive layer is removably coupled to the liner to enable the decorative layer coupled to the second adhesive layer to be repositioned relative the liner to deter a portion of the decorative layer from being separated from the panel. Additionally or alternatively, the second adhesive layer is removably coupled to the liner to enable the decorative layer and the second adhesive layer to be replaced by another decorative layer (e.g., a second decorative layer) and another adhesive layer (e.g., adhesive layer), respectively. For example, the first decorative layer and the second adhesive layer are replaced if the first decorative layer and/or the second adhesive layer become damaged. If the second decorative layer includes a different decorative image than that of the of first decorative layer, the first decorative layer may be replaced with the second decorative layer to enable the decorative image of the second decorative layer to be displayed on the panel. Further, the first decorative layer and the second adhesive layer may be removed from the liner to enable the panel to be repaired without damaging the first decorative layer.

As used herein, the terms "couple," "coupled," and "coupling" refer to a direct or indirect attachment of one object to another object (e.g., one layer to another layer). For example, a first object is directly attached and, thus, coupled to a second object if a surface of the first object contacts a surface of the second object without any other object disposed therebetween. A first object is indirectly attached and, thus, coupled to a second object if the first object does not directly contact the second object but, instead, is fixed to the second object via intermediate object(s) (e.g., layer(s)) that are positioned between the first and second objects.

Turning to the figures, FIG. 1 illustrates an example aircraft 100 including wings 102 (e.g., a right wing and a left wing) extending laterally outward from a fuselage 104. Each of the wings 102 of the illustrated example supports an aircraft engine 106 via a pylon 108. A compartment 110

(e.g., a cargo compartment, a passenger compartment, a flight deck, etc.) is disposed within the fuselage 104 of the illustrated example. The wings 102 and the fuselage 104 define an outer surface 112 of the aircraft 100.

Figure 2A:
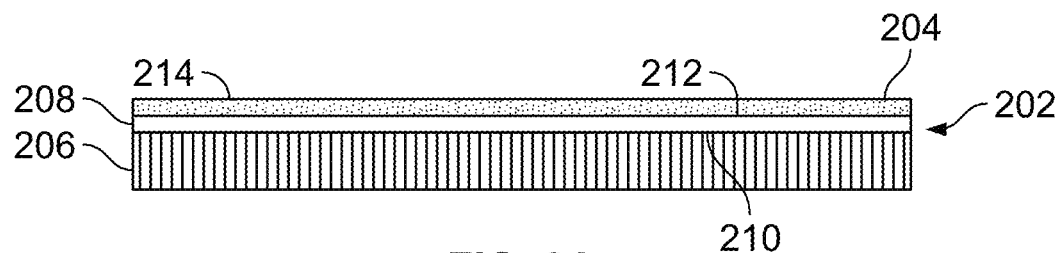
FIG. 2A is a cross-sectional view of a known decorative layer and a portion of a known panel.
Figure 2B:
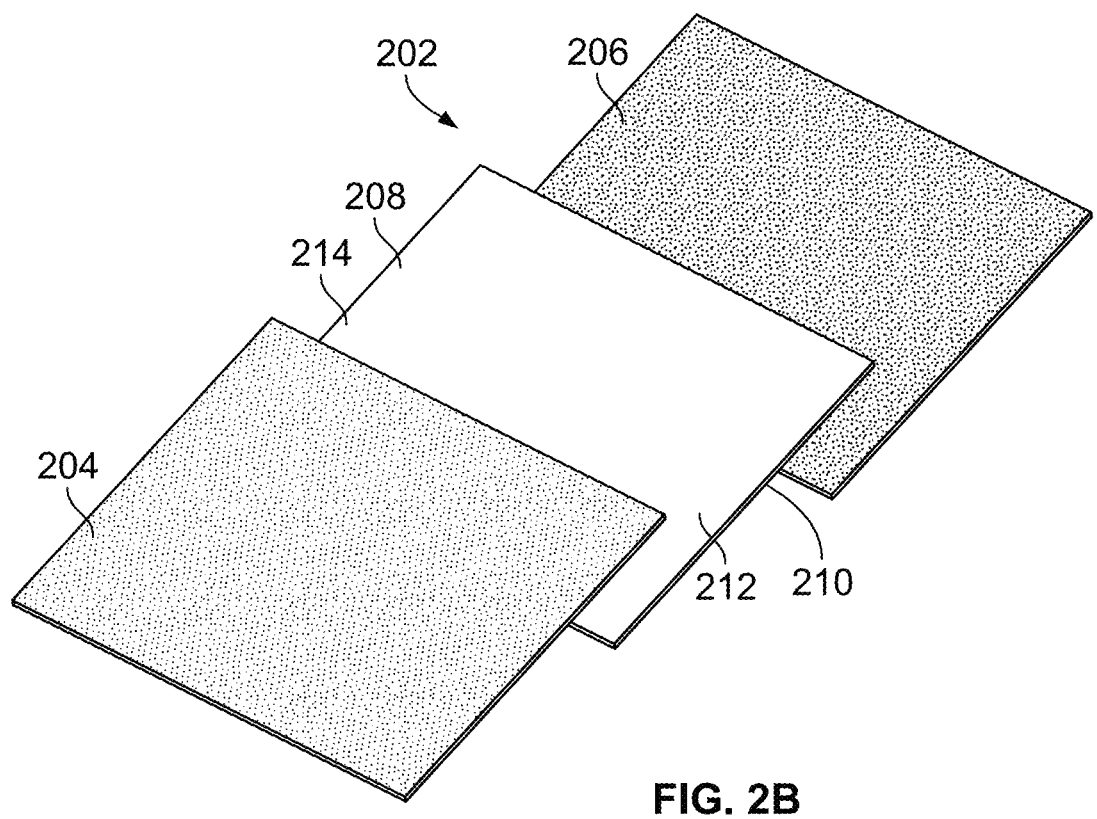
FIG. 2B is an exploded view of the known decorative layer and the portion of the known panel of FIG. 2A.

Before discussing the example decorative layers and the example panels disclosed herein, a brief description of a known panel 202 and a known decorative layer 204 is provided in connection with FIGS. 2A and 2B. More specifically, FIG. 2A is a cross-sectional view of the known decorative layer 204 and a portion of the known panel 202, and FIG. 2B is an exploded view of the known decorative layer 204 and the portion of the known panel 202.

As illustrated in FIGS. 2A and 2B, the known panel 202 includes a core layer 206 and a reinforcing layer 208 coupled to the core layer 206. A first surface 210 of the reinforcing layer 208 engages the core layer 206, and an opposing second surface 212 defines a surface 214 of the panel 202. The reinforcing layer 208 of the known panel 202 may be composed of materials that are partially porous and/or permeable (e.g., resin, fiber reinforcing, etc.) such that some gas and/or vapor (e.g., water vapor) may traverse through the reinforcing layer 208. Further, while not shown in the portion of the known panel 202 illustrated in FIGS. 2A and 2B, another reinforcing layer engages another surface of the core layer 206 opposite the reinforcing layer 208 such that a sandwich-structured composite is formed by the reinforcing layer 208, the core layer 206, and the other opposing reinforcing layer.

Further, the known decorative layer 204 includes decorative features (e.g., colors, patterns, logos, text, etc.) that are to be displayed on the known panel 202. As illustrated in FIG. 2A, the decorative layer 204 is coupled to the surface 214 of the panel 202 to enable the decorative features of the decorative layer 204 to be displayed on the panel 202. For example, the decorative layer 204 is adhesively coupled to the second surface 212 of the reinforcing layer 208.

In some instances, gas and/or vapor (e.g., water vapor) is trapped within the core layer 206 of the panel 202 (e.g., trapped between the reinforcing layer 208 and the opposing reinforcing layer of a sandwich-structured composite of the panel 202). When a difference in pressure and/or temperature between the core layer 206 and the environment exterior to the panel 202 occurs (e.g., when pressure closer to the core layer 206 is greater than pressure closer to the decorative layer 204), the gas and/or vapor escape and/or are emitted from the core layer 206 of the panel 202. In other instances, gas and/or vapor of the panel 202 may originate from an interaction (e.g., a chemical reaction, a physical reaction, etc.) between material of the core layer 206 (e.g., a honeycomb core, a foam core, resin, fiber reinforcing, etc.) and/or the decorative layer 204 (e.g., a decorative laminate, an adhesive layer, etc.).

Because the decorative layer 204 coupled to the panel 202 is composed of substantially impermeable and/or nonporous material, the vapor and/or gas that is emitted from the core layer 206 traverses through the reinforcing layer 208 and becomes trapped between the decorative layer 204 and the surface 214 of the panel 202. The trapped vapor and/or gas create an internal pressure that applies a concentrated force to an adjacent portion of the decorative layer 204 and/or the surface 214 of the panel 202. For example, the applied force pushes a portion of the decorative layer 204 away from the surface 214 of the panel 202, thereby causing the portion of the decorative layer 204 to separate from the panel 202. In other words, vapor and/or gas of the known panel 202 may form bubbles in the known decorative layer 204 that are aesthetically unappealing and/or which damage the decorative layer 204.

Figure 3A:
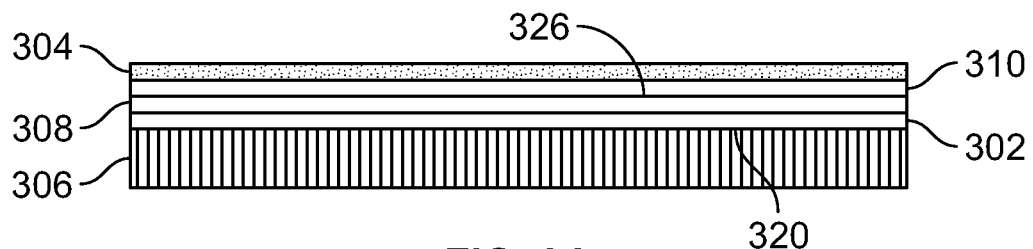
FIG. 3A is a cross-sectional view of an example high-bond adhesive layer disposed between an example decorative layer and an example panel in accordance with the teachings herein.
Figure 3B:
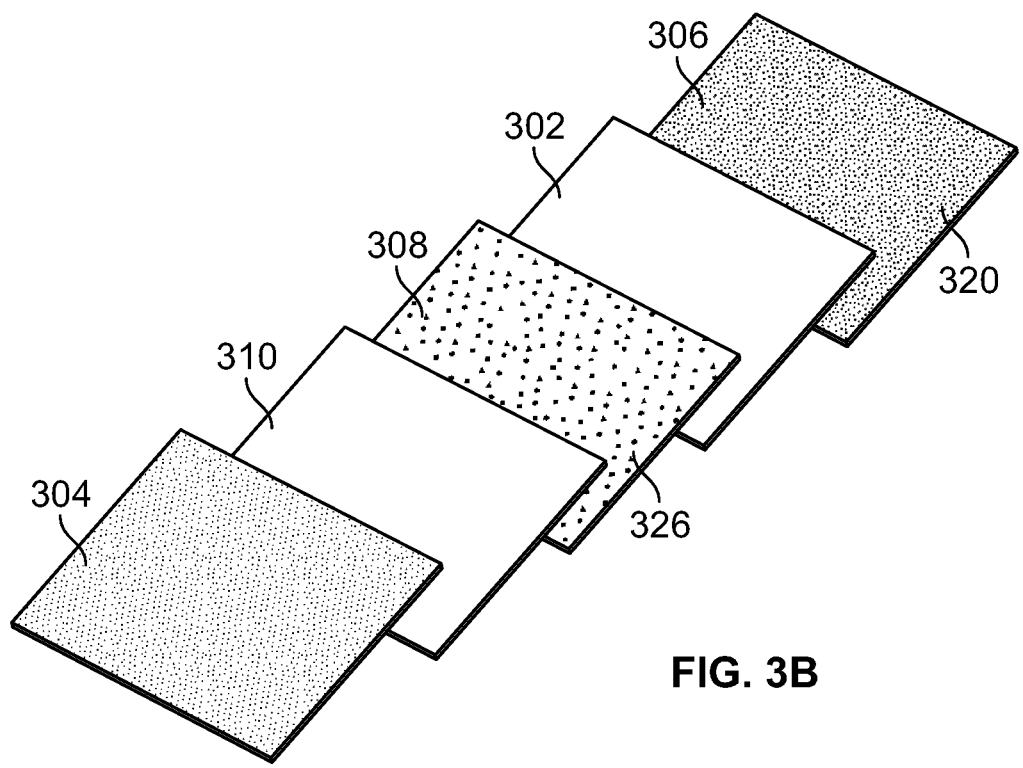
FIG. 3B is an exploded view of the example high-bond adhesive layer, the example decorative layer, and the example panel of FIG. 3A.
Figure 3C:
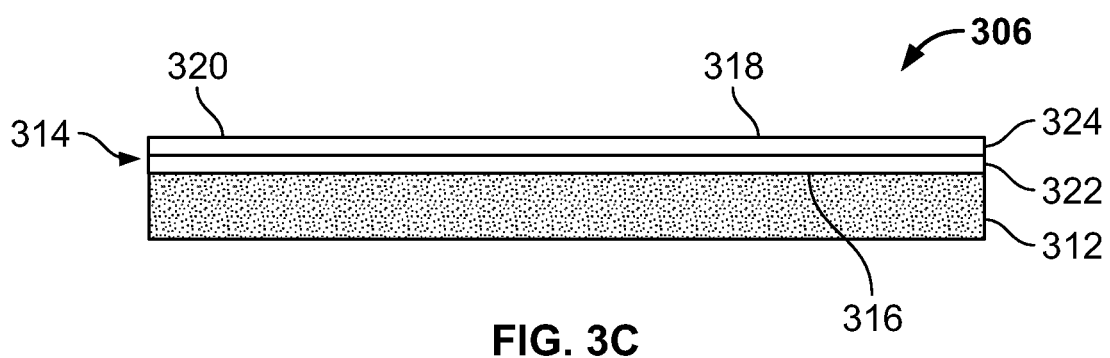
FIG. 3C is a cross-sectional view of a portion the example panel of FIGS. 3A and 3B.

FIGS. 3A-3C illustrate an example high-bond adhesive layer 302 disposed between an example decorative layer 304 and an example panel 306 in accordance with the teachings herein. More specifically, FIG. 3A is a cross-sectional view and FIG. 3B is an exploded view of the high-bond adhesive layer 302, the decorative layer 304, the panel 306, a liner 308, and a second adhesive layer 310. Further, FIG. 3C is a cross-sectional view of a portion of the panel 306. As described in further detail below, the high-bond adhesive layer 302 deters and/or impedes gas and/or vapor from causing a portion of the decorative layer 304 from separating from the panel 306. Further, the high-bond adhesive layer 302, the decorative layer 304, and the panel 306 enable the decorative layer 304 to be removably coupled to the panel 306.

As illustrated in FIG. 3C, the example panel 306 includes a core layer 312 and a reinforcing layer 314. A first surface 316 of the reinforcing layer 314 is coupled to the core layer 312, and an opposing second surface 318 of the reinforcing layer 314 defines a surface 320 of the panel 306 to which the decorative layer 304 is to couple. While FIG. 3C shown a reinforcing layer (e.g., the reinforcing layer 314) coupled to one side of the core layer 312 of the panel 306, another reinforcing layer (e.g., substantially similar or identical to the reinforcing layer 314) not shown in FIG. 3C is coupled to another surface of the core layer 312 opposite the reinforcing layer 314 such that the panel 306 is a sandwich-structured composite formed by the reinforcing layer 314, the core layer 312, and the other opposing reinforcing layer. In such examples, the opposing reinforcing layers (e.g., the reinforcing layer 314 and the other reinforcing layer) trap gas and/or vapor in the core layer 312 of the sandwich-structured panel 306. Further, the panel 306 forms a surface of a wall (e.g., a billboard, a building wall, etc.) and/or a vehicle (e.g., buses, trains, tractor-trailers, ships, etc.) such as the outer surface 112 of the aircraft 100 of FIG. 1 and/or a surface of a bin (e.g., a stow-bin), a lining (e.g., of a sidewall, a ceiling, etc.), furnishings (e.g., a monument, a closet, a crew-rest, a lavatory, etc.) located in the compartment 110 of the aircraft 100 of FIG. 1, etc.

The core layer 312 is composed of, for example, a honeycomb core, a foam core and/or a combination thereof. In some such examples, the core layer 312 includes a honeycomb core and foam core. The core layer 312 is composed of lightweight material(s) and the structure of the core layer 312 (e.g., the honeycomb pattern) provides flexural strength (e.g., bending stiffness) to the panel 306. Thus, the core layer 312 of the illustrated example provides flexural strength to the panel 306 without adding a significant amount of weight to the panel 306 and, thus, to the structure (e.g., the aircraft 100) of which the panel 306 forms a surface.

As illustrated in FIG. 3C, the reinforcing layer 314 of the panel 306 includes a fiber reinforcing layer 322 and a resin layer 324. In the illustrated example, the fiber reinforcing layer 322 is positioned between the resin layer 324 and the core layer 312. In other examples, the resin layer 324 may be positioned between the fiber reinforcing layer 322 and the core layer 312. Additionally or alternatively, the reinforcing layer 314 may include a plurality of fiber reinforcing layers and/or a plurality of resin layers. The fiber reinforcing layer 322 is composed of, for example, fiberglass, graphite-cloth, synthetic fiber (e.g., Aramid fiber), natural fiber, (e.g., wood, flax, cellulose, jute, hemp, straw, switch grass, kenaf, cotton, coir, bamboo, etc.), a combination thereof and/or any other material that reinforces the core layer 312 by providing compression strength to the panel 306. The resin layer 324 bonds the fiber reinforcing layer 322 to the core layer 312 to form the panel 306. In some examples, the reinforcing layer 314 is a pre-impregnated layer (i.e., prepreg) in which the fiber reinforcing layer 322 is pre-impregnated with resin (e.g., resin of the resin layer 324). The pre-impregnated resin is partially cured but not yet hardened to enable the resin to bond to adjacent surfaces (e.g., the fiber reinforcing layer 322 and the core layer 312) upon being more fully cured (e.g., via heat). Thus, in examples in which the reinforcing layer 314 is a pre-impregnated layer, the pre-impregnated resin of the resin layer 324 is cured to couple the fiber reinforcing layer 322 to the core layer 312 to form the panel 306.

Returning to FIGS. 3A and 3B, the high-bond adhesive layer 302 has a bond strength that enables the high-bond adhesive layer 302 to couple to the surface 320 of the panel 306 and the liner 308 to couple to the high-bond adhesive layer 302 that is coupled to the panel 306. Further, the second adhesive layer 310 is fixed to the decorative layer 304 and is coupled to a surface 326 of the liner 308 to couple the decorative layer 304 to the panel 306.

The high-bond adhesive layer 302 of the illustrated example is composed of a substantially impermeable and/or nonporous adhesive material that deters and/or impedes gas and/or vapor (e.g., water vapor) from traversing therethrough. For example, the high-bond adhesive layer 302 is composed of an epoxy-based co-curing composite such as Cytec's Surface Master® 905 and/or any other crosslinked adhesive material that is nonporous and/or substantially impermeable. In some examples, the high-bond adhesive layer 302 is semi-rigid. For example, when the high-bond adhesive layer 302 is composed of the epoxy-based co-curing composite, the high-bond adhesive layer 302 hardens, stiffens, and/or becomes semi-rigid upon being cured. Further, the material of the high-bond adhesive layer 302 provides, for example, high tack, low creep, low flammability and/or other characteristics that improve performance of the decorative layer 304 and/or the panel 306.

In the illustrated example, the liner 308 is coupled to the high-bond adhesive layer 302 to deter and/or impede the second adhesive layer 310 that is coupled to the decorative layer 304 from becoming fixed to the high-bond adhesive layer 302 and, thus, the panel 306. The liner is composed of polyethylene terephthalate (e.g., Mylar®), polyvinyl fluoride (e.g., Tedlar®), polyvinylidene fluoride and/or any other material that enables the liner 308 to remain securely fixed to the high-bond adhesive layer 302 as the second adhesive layer 310 uncoupled or removed from the liner 308. That is, the liner 308 is composed of a material that deters and/or impedes the liner 308 from detaching from the high-bond adhesive layer 302 when an outward force is applied to the decorative layer 304 and/or the second adhesive layer 310 to remove the decorative layer 304 and the second adhesive layer 310 from the liner 308. For example, the material of the liner 308 produces a surface energy that is greater than a surface energy produced by the material of the second adhesive layer 310 to deter and/or impede the liner 308 from detaching from the high-bond adhesive layer 302 as the decorative layer 304 is removed from the panel 306. Further, the material of the liner 308 (e.g., polyethylene terephthalate, polyvinyl fluoride, polyvinylidene fluoride, etc.) deters residue of the second adhesive layer 310 from remaining fixed to the surface 326 of the liner 308 when the second adhesive layer 310 is removed from the liner 308 to deter and/or impede the liner 308 and/or the second adhesive layer 310 from impairing the aesthetic features of the decorative layer 304. For example, the liner 308 deters residue of the second adhesive layer 310 from forming on the surface 326, because the material of the liner 308 produces a surface energy that is less than a surface energy produced by the material of the decorative layer 304. In other examples, the adhesive layer 302 and the liner 308 are a single layer composed of, for example, thermoplastic adhesive that, upon being cured, hardens to deter and/or impede gas and/or vapor from traversing therethrough and produces a sufficient surface energy to deter and/or impede the single layer from decoupling from the panel 306 as the second adhesive layer 310 is removed from the panel 306.

The second adhesive layer 310 is composed of, for example, a pressure-sensitive adhesive (e.g., an acrylic pressure-sensitive adhesive) that enables the decorative layer 304 to be quickly and securely coupled to the liner 308. In some examples, a primer and/or sealer is applied to further enable the decorative layer 304 to be coupled to the liner 308. In the illustrated example, the second adhesive layer 310 has a thickness of about between 0.001 inches (0.025 millimeters) and 0.1 inches (2.54 millimeters). Additionally or alternatively, the second adhesive layer 310 may include a flame-retardant additive that enables the second adhesive layer 310 to provide flame-penetration resistance to the panel 306 to which it is coupled (e.g., to the outer surface 112 and/or a surface in the compartment 110 of the aircraft 100).

The decorative layer 304 is composed of, for example, a laminate that includes decorative features (e.g., colors, patterns, logos, text, etc.). The decorative layer 304 is coupled to the panel 306 to enable the decorative features of the decorative layer 304 to be displayed on a surface (e.g., on the outer surface 112 and/or a surface in the compartment 110 of the aircraft 100) formed by the panel 306. For example, the decorative layer 304 is coupled to the outer surface 112 of the aircraft 100 and/or an interior surface in the compartment 110 of the aircraft 100 to identify and/or advertise an airline carrier associated with the aircraft 100. In some examples, the decorative layer 304 includes a flame-retardant additive that enables the decorative layer 304 to provide flame-penetration resistance to the panel 306 to which it is coupled (e.g., to the outer surface 112 of the aircraft 100, to the interior surface in the compartment 110 of the aircraft 100).

As illustrated in the example of FIGS. 3A and 3B, the decorative layer 304 is coupled to the panel 306 via the liner 308 and the high-bond adhesive layer 302 so that the high-bond adhesive layer 302 is disposed between the decorative layer 304 and the panel 306. Because the high-bond adhesive layer 302 is composed of substantially impermeable material, the high-bond adhesive layer 302 deters and/or impedes gas and/or vapor (e.g., water vapor) that originates from the panel 306 (e.g., that is initially trapped in the core layer 312 between the reinforcing layer 314 and the opposing reinforcing layer of the sandwich-structured panel 306) from escaping to the decorative layer 304. Thus, the high-bond adhesive layer 302 of the illustrated example deters and/or impedes a portion of the decorative layer 304 from separating from the panel 306 (e.g., deters and/or impedes the decorative layer 304 from bubbling).

Further, the second adhesive layer 310 and the liner 308 enable the decorative layer 304 to be removably coupled to the panel 306. For example, if a portion of the decorative layer 304 does become separated from the liner 308, the second adhesive layer 310 can decouple and recouple to the liner 308 to reposition the decorative layer 304 relative the liner 308 so that no portion of the decorative layer 304 is separated from the liner 308. Alternatively, the decorative layer 304 and the second adhesive layer 310 can be removed from the liner 308 and replaced with another decorative layer (e.g., a second decorative layer substantially similar and/or identical to the decorative layer 304) and another adhesive layer (e.g., a third adhesive layer substantially similar and/or identical to the second adhesive layer 310) if, for example, the decorative layer 304 becomes damaged, the second adhesive layer 310 becomes damaged and/or the other decorative layer includes a different decorative feature (e.g., color, pattern, logo, text, etc.) relative to that of the decorative layer 304. Moreover, the high-bond adhesive layer 302, the liner 308, and the second adhesive layer 310 enable the panel 306 to be repaired without damaging the decorative layer 304, thereby reducing maintenance time and/or costs associated with the decorative layer 304 and/or the panel 306.

Figure 4:
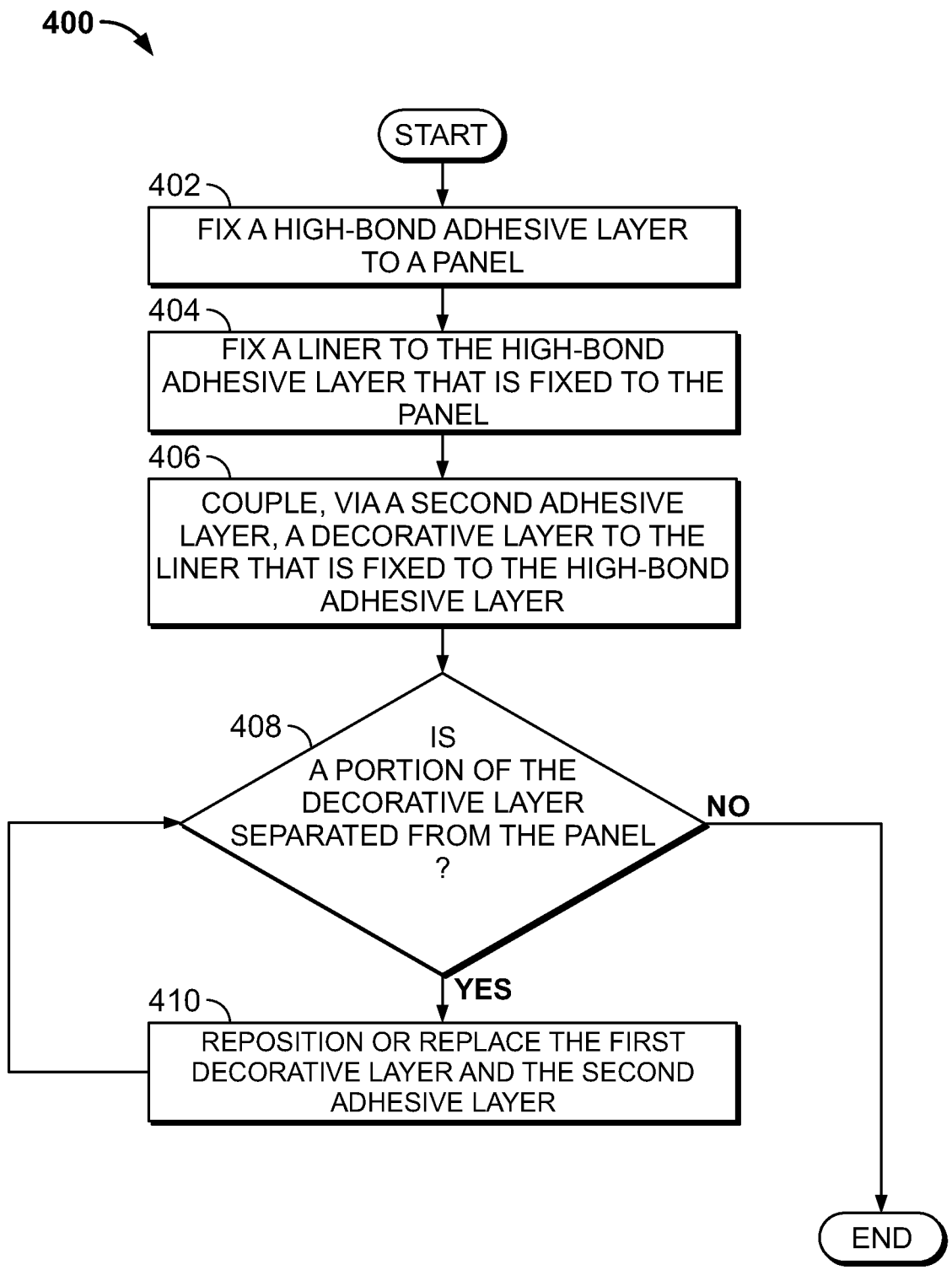
FIG. 4 is a flowchart representative of an example method to assemble the example panel, the example high-bond adhesive layer, and the example decorative layer of FIGS. 3A and 3B in accordance with the teachings herein.

FIG. 4 is a flowchart representative of an example method 400 to assemble an example panel, an example high-bond adhesive layer, and an example decorative layer in accordance with the teachings herein. Although the example method 400 is described with reference to the flowchart illustrated in FIG. 4, many other methods of assembling the panel, the high-bond adhesive layer, and the decorative layer may alternatively be used. For example, the order of execution of the blocks may be changed, and/or some of the blocks described changed, eliminated, and/or combined.

The method 400 for assembling a panel, a high-bond adhesive layer, and a decorative layer is discussed in connection with the high-bond adhesive liner 302, the decorative layer 304, the panel 306, the liner 308 and/or the second adhesive layer 310 of FIGS. 3A-3C. Further, because the method 400 may refer to the high-bond adhesive liner 302, the decorative layer 304, the panel 306, the liner 308 and/or the second adhesive layer 310 of FIGS. 3A-3C, components identified in FIGS. 3A-3C having functions substantially similar or identical to the functions of components described below will not be described in detail again. Instead, the same reference numbers will be used for like structures.

The example method 400 disclosed herein starts at block 402 by fixing a high-bond adhesive layer (e.g., the high-bond adhesive layer 302 of FIGS. 3A and 3B) to a panel (e.g., the panel 306 of FIGS. 3A-3C). For example, the high-bond adhesive layer is coupled to the panel to deter and/or impede gas and/or vapor (e.g., water vapor) that is emitted from the panel from reaching a decorative layer (e.g., the decorative layer 304 of FIGS. 3A and 3B) that is to be coupled to the panel. At block 404, a liner (e.g., the liner 308 of FIGS. 3A and 3B) is fixed to the high-bond adhesive layer that is fixed to the panel. Further, at block 406, the decorative layer is coupled, via a second adhesive layer (e.g., the second adhesive layer 310 of FIGS. 3A and 3B), to the liner that is fixed to the high-bond adhesive layer. For example, the decorative layer is removably coupled to the liner via the second adhesive layer.

At block 408, the example method 400 includes determining whether a portion of the decorative layer is separated from the panel. If a portion of the decorative layer is identified, the example method 400 includes repositioning or replacing the first decorative layer and the second adhesive layer (block 410). For example, at block 410, the first decorative layer and the second adhesive layer may be repositioned relative the liner so that the portion of the decorative layer identified at block 408 is no longer separated from the panel. Alternatively, the first decorative layer and the second adhesive layer may be replaced with a second decorative layer (e.g., a decorative layer substantially similar and/or identical to the decorative layer 304 of FIGS. 3A and 3B) and a third adhesive layer (e.g., an adhesive layer substantially similar and/or identical to the second adhesive layer 310 of FIGS. 3A and 3B), respectively. Blocks 408, 410 are repeated until no portion of the decorative layer is identified as being separated from the panel.

Although certain example methods and apparatus have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. An apparatus comprising:
   a panel;
   a high-bond adhesive layer fixed to the panel, wherein the high-bond adhesive layer is epoxy based adhesive;
   a liner fixed to the panel via the high-bond adhesive layer; and
   a first decorative layer removably coupled to the liner via a second adhesive layer, the high-bond adhesive layer to impede at least one of gas or vapor from escaping the panel to deter the at least one of gas or vapor from exerting a pressure on the first decorative layer to deter a portion of the first decorative layer from separating from the panel, wherein a material of the liner has a surface energy that is greater than a surface energy of a material of the second adhesive layer to prevent the liner from detaching from the panel when the first decorative layer is removed from the liner.

2. The apparatus of claim 1, wherein the second adhesive layer is removably coupled to the liner to enable the first decorative layer to be repositioned relative to the liner.

3. The apparatus of claim 1, wherein the second adhesive layer is removably coupled to the liner to enable the first decorative layer to be replaced with a second decorative layer and a third adhesive layer, the second decorative layer to couple to the liner via the third adhesive layer.

4. The apparatus of claim 3, wherein the second decorative layer includes a different decorative pattern than the first decorative layer.

5. The apparatus of claim 1, wherein the liner deters the second adhesive layer from engaging the high-bond adhesive layer.

6. The apparatus of claim 1, wherein the epoxy based adhesive is semi-rigid.

7. The apparatus of claim 1, wherein the epoxy based adhesive is crosslinked.

8. The apparatus of claim 1, wherein the material of the liner deters residue of the second adhesive layer from remaining fixed to the liner when the second adhesive layer is decoupled from the liner.

9. The apparatus of claim 1, wherein the material of the liner is composed of polyethylene terephthalate, polyvinylidene fluoride, or polyvinyl fluoride.

10. The apparatus of claim 1, wherein the second adhesive layer is composed of a pressure-sensitive adhesive.

11. The apparatus of claim 1, wherein the first decorative layer and the second adhesive layer are composed of fire-resistant materials and the panel is a portion of a surface of an aircraft to provide fire-resistance to the aircraft.

12. An apparatus comprising:
a panel;
a high-bond adhesive layer directly coupled to the panel, wherein the high-bond adhesive layer is epoxy based adhesive;
a liner having a first side and a second side opposite the first side, the first side of the liner being directly coupled to the panel via the high-bond adhesive layer; and
a decorative layer directly coupled to the second side of the liner via a pressure-sensitive adhesive layer, the high-bond adhesive layer to impede at least one of gas or vapor from escaping the panel to deter the at least one of gas or vapor from exerting a pressure on the decorative layer to deter a portion of the decorative layer from separating from the panel wherein a material of the liner has a surface energy that is greater than a surface energy of a material of the second adhesive layer to prevent the liner from detaching from the panel when the first decorative layer is removed from the liner.

13. The apparatus of claim 12, wherein the pressure-sensitive adhesive layer is removably coupled to the liner to enable the decorative layer to be repositioned relative to the liner.

14. The apparatus of claim 12, wherein the epoxy based adhesive is at least one of a nonporous material or an impermeable material to impede the at least one of gas or vapor from escaping the panel.

15. The apparatus of claim 12, wherein the liner deters residue of the pressure-sensitive adhesive from remaining fixed to the liner when the second adhesive layer is decoupled from the liner.

16. A method of making an apparatus, the method comprising:
fixing a high-bond adhesive layer to a panel, wherein the high-bond adhesive layer is epoxy based adhesive;
fixing a liner to the panel via the high-bond adhesive layer; and
removably coupling a first decorative layer to the liner via a second adhesive layer, the high-bond adhesive layer to impede at least one of gas or vapor from escaping the panel to deter the at least one of gas or vapor from exerting a pressure on the first decorative layer to deter a portion of the first decorative layer from separating from the panel, wherein a material of the liner has a surface energy that is greater than a surface energy of a material of the second adhesive layer to prevent the liner from detaching from the panel when the first decorative layer is removed from the liner.

17. The method of claim 16, further including decoupling the second adhesive layer from the liner to enable the first decorative layer and the second adhesive layer to be repositioned relative the liner.

18. The method of claim 16, further including:
decoupling the second adhesive layer from the liner to remove the first decorative layer from the liner; and
removably coupling a second decorative layer to the liner via a third adhesive layer to replace first decorative layer and the second adhesive layer with the second decorative layer and the third adhesive layer.

19. The method of claim 16, wherein coupling the liner to the high-bond adhesive layer deters the second adhesive layer from engaging the high-bond adhesive layer.

20. The method of claim 16, the first decorative layer and the second adhesive layer are composed of fire-resistant materials and the panel is a portion of a surface of an aircraft to provide fire-resistance to the aircraft.

* * * * *